United States Patent [19]

Garbutt et al.

[11] Patent Number: 4,981,592

[45] Date of Patent: Jan. 1, 1991

[54] ANAEROBIC DIGESTION WITH ADDITION OF ENZYMES

[75] Inventors: John T. Garbutt; Claire L. Smith, both of Muscatine, Iowa

[73] Assignee: Grain Processing Corporation, Muscatine, Iowa

[21] Appl. No.: 306,508

[22] Filed: Feb. 3, 1989

[51] Int. Cl.$^5$ ................................................ C02F 3/28
[52] U.S. Cl. .................................... 210/606; 210/631; 210/632; 210/612; 435/222; 435/801; 435/836
[58] Field of Search ............... 210/612, 603, 606, 631, 210/632, 610, 611; 435/262, 221, 222, 219, 836, 801

[56] References Cited

U.S. PATENT DOCUMENTS 3,915,853  10/1975  Luck ..................................... 210/612
4,342,650   8/1982  Erickson et al. ..................... 210/632

FOREIGN PATENT DOCUMENTS 0467422  5/1971  Australia ............................. 210/606

OTHER PUBLICATIONS

Rudolfs "Enzymes and Sludge Digestion", Sewage Works Journal, 1932, pp. 782-789.

Primary Examiner—Peter Hruskoci
Assistant Examiner—Christopher Upton
Attorney, Agent, or Firm—Neuman, Williams, Anderson & Olson

[57]  ABSTRACT

Addition of alkaline proteolytic enzymes derived from *Bacillis licheniformis* in the anaerobic stage of bacterial digestion processes to improve the settling properties of the bacterial biomass.

4 Claims, No Drawings

ANAEROBIC DIGESTION WITH ADDITION OF ENZYMES

This invention relates to improvements in processes wherein organic materials are treated with bacterial microorganisms to alter or break down the organic materials.

In one broad aspect, the invention relates to the treatment of waste streams. For example, many processes employed today for treating water streams, such as wastewater from industrial plants, are based on the breakdown of organic materials primarily to methane, hydrogen, carbon dioxide and water by bacterial organisms. One stage of such processes usually is carried out by treating the waste stream with anaerobic active bacteria in a substantially oxygen-free environment. The major gaseous products of this anaerobic digestion stage are carbon dioxide and methane which can often be burned as a source of energy. After the anaerobic treatment, the biomass is allowed to settle, the clear effluent on top is drawn off and the remaining undigested organic material is broken down by treatment with aerobic-active bacteria in an oxygen adequate environment. The breakdown products resulting from the aerobic treatment are largely carbon dioxide and water.

One of the keys to the successful operation of a waste treatment process utilizing bacteria is that in the anaerobic step the biomass must settle so that the clear, treated effluent can be transferred elsewhere for aerobic treatment. If the biomass settles slowly, less material can be treated in a given period of time and large settling vessels are required to achieve the desired rate of biochemical oxygen demand (BOD) removal.

We have now found that the settling of the biomass in anaerobic digestion of organic materials can be improved by use of proteolytic enzymes. By the incorporation of a small amount of a proteolytic enzyme in the anaerobic treatment, settling rates of the biomass can be significantly increased resulting in increased capacity of the treatment system with no additional capital expense.

The present invention relates to an advantageous improvement in processes wherein an organic material in an aqueous medium is treated or digested with bacterial organisms to degrade or convert the same. Thus, the present invention relates to waste treatment processes wherein bacterial organisms are employed to digest organic materials and to bacterial fermentation processes wherein bacteria are utilized to act on an organic material to produce fermentation products such as, for example, antibiotics, amino acids, organic acids, hormones and other fermentation products. The present invention is particularly advantageous for treating materials containing filamentous bacteria.

The addition of proteolytic enzymes in the anaerobic stage of bacterial digestion processes improves the settling properties of the bacterial biomass. This improved settling enables more of the clear, digested effluent to be separated more rapidly from the bacterial biomass. Thus, more of the biochemical oxygen demand can be digested at a faster rate.

In accordance with this invention, in a process wherein an organic material-containing aqueous medium is digested with bacteria under anaerobic conditions, a proteolytic enzyme is added. The proteolytic enzyme is preferably added in amounts of 0.001 to 0.05% by volume of the aqueous organic-containing medium and preferably the medium is maintained at a pH of from about 6.5 to 7.5. The beneficial effect of the proteolytic enzyme is most pronounced at temperatures in the range of about 30° to 60° C. The enzyme is permitted to remain in the substrate undergoing anaerobic digestion for a desired period and will function to increase the settling rate.

The enzymes which are employed in accordance with this invention are alkaline proteolytic enzymes which act on filamentous (long chain) bacteria. Such proteases are commercially available, examples of which are: "ALCALASE 2.4L", an endoproteinase derived from *Bacillus licheniformis* and "SAVINASE 8.0L", an endoproteinase derived from a Bacillus strain, both available from Novo Laboratories, Inc., Danbury, Conn.; "ENZECO ® Alkaline Protease-L", an endoproteinase from a Bacillus strain available from Enzyme Development Corporation, New York, N.Y.; and "PAPAIN", a protease derived from the papaya plant, *Carica papaya*, available from Miles, Inc., Elkhart, Ind.; and the like.

The following examples illustrate the advantages of the invention:

EXAMPLE I

Soy whey, a by-product stream from the production of soy protein isolate, is poorly digested by anaerobic biomass in wastewater treatment systems and also has an adverse effect on biomass settling. To illustrate the benefits of this invention, the following enzyme treatments of soy whey were conducted:

Treatment A - Seven hundred milliliters soy whey, adjusted to pH 8.0, 0.7 milliliter of Alcalase 2.4L, (Novo Industri A/S, protease) added and incubated at 55° C. for four hours.

Treatment B - Same as Treatment A except 0.7 milliliter Rohament 7069 (Rohm Tech, cellulase) added at pH 4.5.

Treatment C - Same as Treatment A except 0.7 milliliter Novozym 188 (Novo Industri A/S, cellulase) added at pH 4.5.

Treatment D - Autoclave 700 milliliters soy whey at pH 1.5 for 30 minutes.

Treatment E - 700 milliliters of soy whey with no treatment.

All of the above samples were adjusted to pH 7.0 and treated as described below.

Into one liter Erlenmeyer flasks, equipped with vented stoppers to allow gas to escape but prevent air from entering, were placed 750 milliliters of anaerobic biomass wastewater obtained from a corn and soy processing plant and 250 milliliters of the above samples, A through E. All flasks were set up in duplicate and stirred magnetically at 37° C.

The flasks were assayed at 0, 3 and 5 days for total solids (TS)[a] and volatile organic solids (VS)[b]. From these data the amount of volatile organic solids digested[c] was determined. With the magnetic stirrer turned off, the volume of settled biomass was also determined after 30 and 60 minutes. The results of these tests are given in Table 1.

TABLE 1

Anaerobic Digestion of Soy Whey - Effect of Enzymes on Digestion and Settling Properties of Biomass

| | Treatment | Volatile Solids Digested, % | Volume of Settled Biomass, ml | | Volume of Clear Effluent, ml | |
|---|---|---|---|---|---|---|
| | | | 30 minutes | 60 minutes | 30 minutes | 60 minutes |
| 1. | Alcalase (protease) | 49.6 | 480 | 395 | 520 | 605 |
| 2. | Rohament (cellulase) | 46.5 | 790 | 595 | 210 | 405 |
| 3. | Novozym (cellulase) | 41.9 | 850 | 630 | 150 | 370 |
| 4. | Autoclave at pH 1.5 | 40.5 | 865 | 700 | 135 | 300 |
| 5. | Control (no treatment) | 44.6 | 765 | 580 | 235 | 420 | a Ten milliliter aliquot dried at 100° C. for four hours in tared dish.
b Residue from TS samples ashed at 545° C. for two hours.
c % Volatile Organic Solids digestion = $\frac{\text{total solids} - \text{residue from TS samples, ashed}}{\text{total solids}} \times 100$ The above data show, the protease, Alcalase 2.4L, increased digestion of volatile organic solids and the biomass settled much more rapidly than that of the control. The cellulase, Rohament 7069, improved digestion slightly but had no effect on settling. The Novozym cellulase as well as autoclaving at pH 1.5 were slightly inhibitory on digestion and settling properties.

EXAMPLE 2

In this example, one liter aliquots of anaerobic biomass from a treating plant processing wastewater from a corn and soy processing plant were treated with varying levels of Alcalase 2.4L. Sludge volumes were determined at 60 minutes by stopping the magnetic stirrers. The digesters employed were one liter Erlenmeyer flasks as described in Example 1. The results are shown in Table 2.

TABLE 2

Effect of Proteases on Settled Sludge Volumes of Anaerobic Biomass

| | | Settled Sludge Volume, ml. | | |
|---|---|---|---|---|
| Sample | Treatment | Day 1 60 min. | Day 2 60 min. | Day 3 60 min. |
| Control | No protease | 965 | 975 | 920 |
| Alcalase | 0.05% v/v | 605 | 620 | 590 |
| | 0.005% v/v | 870 | 875 | 705 |
| | 0.001% v/v | 930 | 965 | 870 |
| Neutrase | 0.05% v/v | 955 | 970 | 905 |
| | 0.005% v/v | 960 | 975 | 915 |

The alkaline Alcalase enzyme afforded improvement in settling even at levels as low as 0.001% v/v, whereas Neutrase (a neutral proteolytic enzyme) had very little effect on settling.

EXAMPLE 3

Larger fermentation studies were conducted to confirm the effect of Alcalase 2.4L on the settling properties of anaerobic biomass. In this study, 12-liter aliquots of anaerobic biomass, obtained from a plant processing wastewater from a corn and soy processing plant were placed in three Microferm Laboratory Fermentors K, L and M (Model F214, New Brunswick Scientific Co.) equipped with mechanical agitators and temperature controlled at 35° C. Microferms K and L received 0.05% v/v and 0.001% v/v of Alcalase 2.4L, respectively. Microferm M received no Alcalase 2.4L and served as a control. Each day the agitation was stopped and the volume of settled biomass was determined 60 minutes after the agitation was turned off. After settling was completed, 3000 milliliters of clear supernate above the biomass was removed from each Microferm and replaced with 3000 milliliters of fresh wastewater feed obtained from a corn and soy processing plant. Agitation was resumed. This process was repeated on a daily basis. The results obtained are shown in Table 3.

TABLE 3

Effect of Alcalase 2.4 L on Settling Properties of Anaerobic Biomass in 12-Liter Fermentors

| | Settled Biomass After 60 Minutes, % of Total Volume Alcalase 2.4 L, % v/v | | |
|---|---|---|---|
| Day | 0.05 | 0.001 | 0 |
| 1 | 68 | 75 | 84 |
| 2 | 58 | 75 | 86 |
| 3 | 57 | 77 | 87 |
| 7 | 53 | 74 | 85 |
| 8 | 52 | 78 | 92 |
| 9 | 50 | 75 | 86 |
| 10 | 49 | 74 | 84 |
| 11 | 49 | 75 | 84 |
| 14 | 48 | 73 | 82 |
| 15 | 50 | 78 | 83 |
| 16 | 51 | 74 | 82 |
| 17 | 49 | 68 | 80 |
| 18 | 49 | 70 | 78 |
| 21 | 49 | 68 | 76 |
| 22 | 59 | 63 | 76 |
| 23 | 49 | 66 | 76 |
| 24 | 48 | 68 | 75 |

These results demonstrate that the alkaline proteolytic enzyme markedly improves settling properties of the anaerobic biomass. The advantages of this effect is that more wastewater can be processed at a faster rate without loss of the microbial biomass.

EXAMPLE 4

In this experiment several enzymes other than Alcalase 2.4L were tested for their effect on the settling properties of anaerobic biomass. The tests were conducted as described in Example 1. The enzymes employed and the results obtained are shown in Table 4.

TABLE 4

The Effect of Enzymes on Settling of Anaerobic Biomass

| | Settled Biomass After 60 Min. % of Total Volume Days | | |
|---|---|---|---|
| Enzyme | 1 | 2 | 3 |
| Control, no enzyme | 97 | 96 | 92 |

TABLE 4-continued

The Effect of Enzymes on Settling of Anaerobic Biomass

| Enzyme | Settled Biomass After 60 Min. % of Total Volume Days | | |
|---|---|---|---|
| | 1 | 2 | 3 |
| Bacterial Alpha-Amylase[a], 0.005% v/v | 96 | 95 | 89 |
| Cellulase[b], 0.005% v/v | 97 | 94 | 82 |
| Papain[c], 0.005% w/v | 96 | 88 | 78 |
| Alcalase 2.4 L, 0.005% v/v | 94 | 82 | 68 |
| Alcalase 2.4 L, 0.005% v/v and Cellulase, 0.005% v/v | 93 | 78 | 71 |

[a]Canalpha 600, Biocon Ltd., Lexington, Kentucky
[b]Genencor 150L, Genencor, Inc., S. San Francisco, California
[c]Papain, Miles Inc., Elkhart, Indiana The data show that the bacterial alpha-amylase had little or no effect. Alcalase was the most effective enzyme in improving settling. Papain and cellulase also improved settling bu the effect found with the cellulase enzyme could be due to a protease impurity in the product.

EXAMPLE 5

Another alkaline protease, Savinase 0.8L, obtained from Novo Industri A/S, was evaluated in a similar manner as Alcalase 2.4L. Two hundred milliliter aliquots of anaerobic biomass obtained from waste water from a corn and soy processing plant, were placed in 250 milliliter Erlenmeyer flasks fitted with vented stoppers, as described in Example 1. To the flasks was added 0.02, 0.04, and 0.08% V/V of Savinase 8.0L. The flasks were set in a shaking water bath at 35° C. for 18 hours. Agitation was stopped and the volume of settled biomass determined after 60 minutes. The results are shown below.

| Sample | Enzyme Level (% v/v) | Settled Biomass (% of Total Volume) |
|---|---|---|
| 1 | 0 | 82 |
| 2 | 0.02 | 75 |
| 3 | 0.04 | 71 |
| 4 | 0.08 | 68 |

The data show the degree of biomass settling is a function of enzyme concentration.

The entire contents of samples 1 and 2 were centrifuged, the clear effluent discarded and the insoluble biomass washed twice with water. The washings were discarded and the biomass diluted to 100 milliliters. The washed biomass and the original biomass prior to centrifugation were assayed for total solids, protein and were also examined microscopically. The results are shown below.

| | Non-Centrifuged Biomass | Centrifuged Biomass | |
|---|---|---|---|
| | | Sample 1 (no enzyme) | Sample 2 (0.02% enzyme) |
| Dry Solids, % v/v | 0.49 | 0.607 | 0.565 |
| Volume, ml | 200 | 100 | 100 |
| Dry Solids, g | 0.98 | 0.607 | 0.565 |
| Solids Recovered, % | 100 | 61.9 | 57.7 |
| Protein, % w/v as-is | 0.15 | 0.23 | 0.20 |
| Protein, % dry basis | 30.6 | 37.9 | 35.4 |
| Protein Recovered | 100 | 76.7 | 67 |
| Microscopic Exam | Many long chain bacteria | Many long chain bacteria | Mostly short chain bacteria |

The above data show that protease treatment of the anaerobic biomass results in a lower protein recovery, a lower protein content and a lower solids recovery than in the sample not treated with the protease. Also, the microscopic examination shows a marked reduction of long chain bacteria that are found in the non-protease treated samples. These results indicate that the protease hydrolyzes the long chain (filamentous) bacteria enabling the anaerobic biomass to settle more rapidly. The elimination of the long chain bacteria accounts, at least in part, for the lower protein content and lower solids recovery in the enzyme treated biomass (Sample 2).

Microbial fermentation broths are sources of many important commercial products i.e., antibiotics, enzymes, vitamins and hormones to cite a few. It is important in the processing of these fermentation broths that the bacterial organisms have good settling, filtration or centrifugation properties in order to recover the desired product in an efficient and cost effective manner. However, some of these organisms grow as long chain and tend to settle poorly making separation of the cells very difficult. Consequently, this often results in lower product recovery and higher costs. Such broths can be treated with an alkaline proteolytic enzyme in accordance with this invention to hydrolyze the long chain bacteria and afford advantageous processing advantages (i.e., improved settling and filterability) and lower product costs.

Those modifications and equivalents which fall within the spirit of the invention are to be considered a part thereof.

What is claimed is:

1. In a process wherein an organic substrate is digested with bacteria for a period under anaerobic conditions, the improvement which consists essentially of incorporating in the organic substrate undergoing digestion an alkaline endoproteinase derived from Bacillus licheniformis.

2. A process in accordance with claim 1, where the organic substrate is a wastewater stream.

3. A process in accordance with claim 1 where the organic substrate is a fermentation broth.

4. A process in accordance with claim 1 where the alkaline porteolytic enzyme is incorporated in the organic substrate at a temperature between about 30° and 60° C.

* * * * *